United States Patent
Huang (10) Patent No.: US 11,987,310 B2
(45) Date of Patent: May 21, 2024

(54) SWINGING LOCKING MECHANISM FOR BICYCLE RACK AND BICYCLE RACK HAVING THE SAME

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 678 days.

(21) Appl. No.: 17/117,738

(22) Filed: Dec. 10, 2020

(65) Prior Publication Data

US 2022/0185405 A1    Jun. 16, 2022

(51) Int. Cl.
*E05B 71/00* (2006.01)
*B62H 3/10* (2006.01)
*B62H 3/12* (2006.01)

(52) U.S. Cl.
CPC .................. *B62H 3/12* (2013.01); *B62H 3/10* (2013.01); *E05B 71/00* (2013.01)

(58) Field of Classification Search
CPC .. E05B 71/00; Y10T 292/03; Y10T 292/0995; Y10T 292/28; Y10T 292/282; Y10T 292/285; Y10T 292/288; Y10T 292/293; Y10T 292/302; Y10T 292/305; Y10T 292/306; Y10T 292/546; B62H 3/10; B62H 3/12
USPC .................................................... 70/233, 235
See application file for complete search history.

(56) References Cited

U.S. PATENT DOCUMENTS

| | | | | |
|---|---|---|---|---|
| 71,135 | A * | 11/1867 | Charantre | E05D 11/1007 16/334 |
| 4,248,451 | A * | 2/1981 | Usinger | B60D 1/07 280/455.1 |
| 5,526,661 | A * | 6/1996 | Lin | B62K 25/02 70/213 |
| 5,685,469 | A * | 11/1997 | Stapleton | B60R 9/10 224/536 |
| 6,129,371 | A * | 10/2000 | Powell | B60R 9/06 280/491.5 |

(Continued)

FOREIGN PATENT DOCUMENTS

GB            2238031 A  *  5/1991  ............... B60R 9/10

*Primary Examiner* — Carlos Lugo
(74) *Attorney, Agent, or Firm* — MUNCY, GEISSLER, OLDS & LOWE, PC (57) ABSTRACT

A swinging locking mechanism for a bicycle rack is provided, configured to be assembled with a base of a hanging member, including a first rod member, a first connecting rod, a second rod member, a second connecting rod and an operating member. The first connecting rod is movably disposed on the first rod member and includes at least one second engaging portion releasably engaged with the at least one first engaging portion. The second rod member is non-swingably sleeved with the first rod member. The second connecting rod is movably disposed on the second rod member and detachably assembled with the first connecting rod. The operating member is connected with the second connecting rod. The bicycle rack including the swinging locking mechanism is further provided, further including: a carrying frame, connected with the swinging locking mechanism and configured to carry at least one bicycle.

9 Claims, 6 Drawing Sheets

(56) References Cited

U.S. PATENT DOCUMENTS

| | | | | |
|---|---|---|---|---|
| 6,511,088 B2* | 1/2003 | Kahlstorf | ............... | B60D 1/075 |
| | | | | 280/415.1 |
| 6,588,636 B1* | 7/2003 | Young | ................. | B60R 9/06 |
| | | | | 224/220 |
| 6,612,615 B1* | 9/2003 | Dimand | .................. | B60R 9/06 |
| | | | | 224/547 |
| 6,829,914 B2* | 12/2004 | Bullock | ................ | B60R 25/00 |
| | | | | 70/238 |
| 8,276,317 B2* | 10/2012 | Williams | ................. | E05C 17/48 |
| | | | | 292/277 |
| 9,663,040 B1* | 5/2017 | Shen | .................. | B60R 9/10 |
| 9,802,549 B1* | 10/2017 | Shen | .................. | B60R 9/10 |
| 9,987,998 B2* | 6/2018 | Shen | .................. | B60R 9/06 |
| 10,011,237 B1* | 7/2018 | Phillips | .................. | B60R 9/06 |
| 10,183,627 B1* | 1/2019 | Liu | .................. | B60R 9/06 |
| 10,906,473 B1* | 2/2021 | Yu | .................. | B60R 9/06 |
| 11,148,607 B1* | 10/2021 | Hsieh | .................. | B60R 9/045 |
| 11,383,779 B1* | 7/2022 | Huang | .................. | B62H 3/00 |
| 11,479,182 B1* | 10/2022 | Yang | .................. | B60R 9/10 |
| 11,511,677 B2* | 11/2022 | Peng | .................. | B60R 9/10 |
| 11,628,777 B2* | 4/2023 | Huang | .................. | B60R 9/06 |
| | | | | 224/569 |
| 2008/0230579 A1* | 9/2008 | Wang | .................. | B60R 9/10 |
| | | | | 224/400 |
| 2011/0011909 A1* | 1/2011 | Liu | .................. | B60R 9/10 |
| | | | | 224/523 |
| 2014/0246467 A1* | 9/2014 | Hein | .................. | B60R 9/06 |
| | | | | 224/400 |
| 2023/0174179 A1* | 6/2023 | Huang | .................. | B60R 9/048 |
| | | | | 224/42.4 |

* cited by examiner

SWINGING LOCKING MECHANISM FOR BICYCLE RACK AND BICYCLE RACK HAVING THE SAME

BACKGROUND OF THE INVENTION

Field of the Invention

The present invention relates to a swinging locking mechanism for a bicycle rack and a bicycle rack having the same.

Description of the Prior Art

In order to facilitate carrying the bicycle, a bicycle rack is usually installed at the rear of a vehicle for carrying the bicycle. The bicycle rack includes a connecting rod for connecting to the vehicle, a base connected to the connecting rod, and a carrying frame pivoted to pivotally connected to the base and configured for placing the bicycle. The carrying frame can swing relative to the base by operating a locking mechanism, and can be positioned in a carrying position or a folded position. When no bicycle is carried on the carrying frame, the carrying frame can be swung to collapse toward the vehicle, thus reducing the volume and avoiding damage to the vehicle due to collision.

However, the operating position of the conventional locking mechanism is mostly set adjacent to the base. As the base has a large size (for example, there are carrying frames disposed laterally), the operating position of the locking mechanism is hard to be reached. Besides, the bicycle rack is too large, which is not conducive to storage and transportation.

The present invention is, therefore, arisen to obviate or at least mitigate the above-mentioned disadvantages.

SUMMARY OF THE INVENTION

The main object of the present invention is to provide a swinging locking mechanism for a bicycle rack and a bicycle rack having the same, which is easy to operate, assemble/disassemble and store.

To achieve the above and other objects, the present invention provides a swinging locking mechanism for a bicycle rack, configured to be assembled with a base of a hanging member which is configured to be detachably connected to a hitch mechanism of a vehicle, the base including at least one first engaging portion, swinging locking mechanism including: a first rod member, configured to be movably assembled to the base; a first connecting rod, movably disposed on the first rod member and including at least one second engaging portion releasably engaged with the at least one first engaging portion, the at least one second engaging portion being movable between a locking position and a release position; a second rod member, non-swingably sleeved with the first rod member; a second connecting rod, movably disposed on the second rod member the second rod member and detachably assembled with the first connecting rod; and an operating member, connected with the second connecting rod; wherein when the at least one second engaging portion is located in the locking position, the at least one second engaging portion and the at least one first engaging portion are engaged with each other, and the swinging locking mechanism is non-swingable relative to the base; when the operating member operates to drive the second connecting rod and the first connecting rod to move the at least one second engaging portion to be located in the release position, the at least one second engaging portion and the at least one first engaging portion are disengaged with each other, the swinging locking mechanism is swingable relative to the base.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 6 for a preferable embodiment of the present invention. A swinging locking mechanism for a bicycle rack is configured to be assembled with a base 101 of a hanging member 100 which is configured to be detachably connected to a hitch mechanism of a vehicle. The base 101 includes at least one first engaging portion 102. The swinging locking mechanism 1 includes a first rod member 10, a first connecting rod 20, a second rod member 30, a second connecting rod 40 and an operating member 50.

The first rod member 10 is configured to be movably assembled to the base 101. The first connecting rod 20 is movably disposed on the first rod member 10 and includes at least one second engaging portion 21 releasably engaged with the at least one first engaging portion 102, and the at least one second engaging portion 21 is movable between a locking position and a release position. The second rod member is non-swingably sleeved with and the first rod member 10. The second connecting rod 40 is movably disposed on the second rod member 30 and detachably assembled with the first connecting rod 20. The operating member 50 is connected with the second connecting rod 40. When the at least one second engaging portion 21 is located in the locking position, the at least one second engaging portion 21 and the at least one first engaging portion 102 are engaged with each other, the swinging locking mechanism 1 is non-swingable relative to the base 101; when the operating member 50 operates to drive the second connecting rod 40 and the first connecting rod 20 to move the at least one second engaging portion 21 to be located in the release position, the at least one second engaging portion 21 and the at least one first engaging portion 102 are disengaged with each other, the swinging locking mechanism 1 is swingable relative to the base 101. Whereby, it is convenient to operate, and it is easy to assemble/disassemble the first rod member 10 and the second rod member 30.

Figure 2:
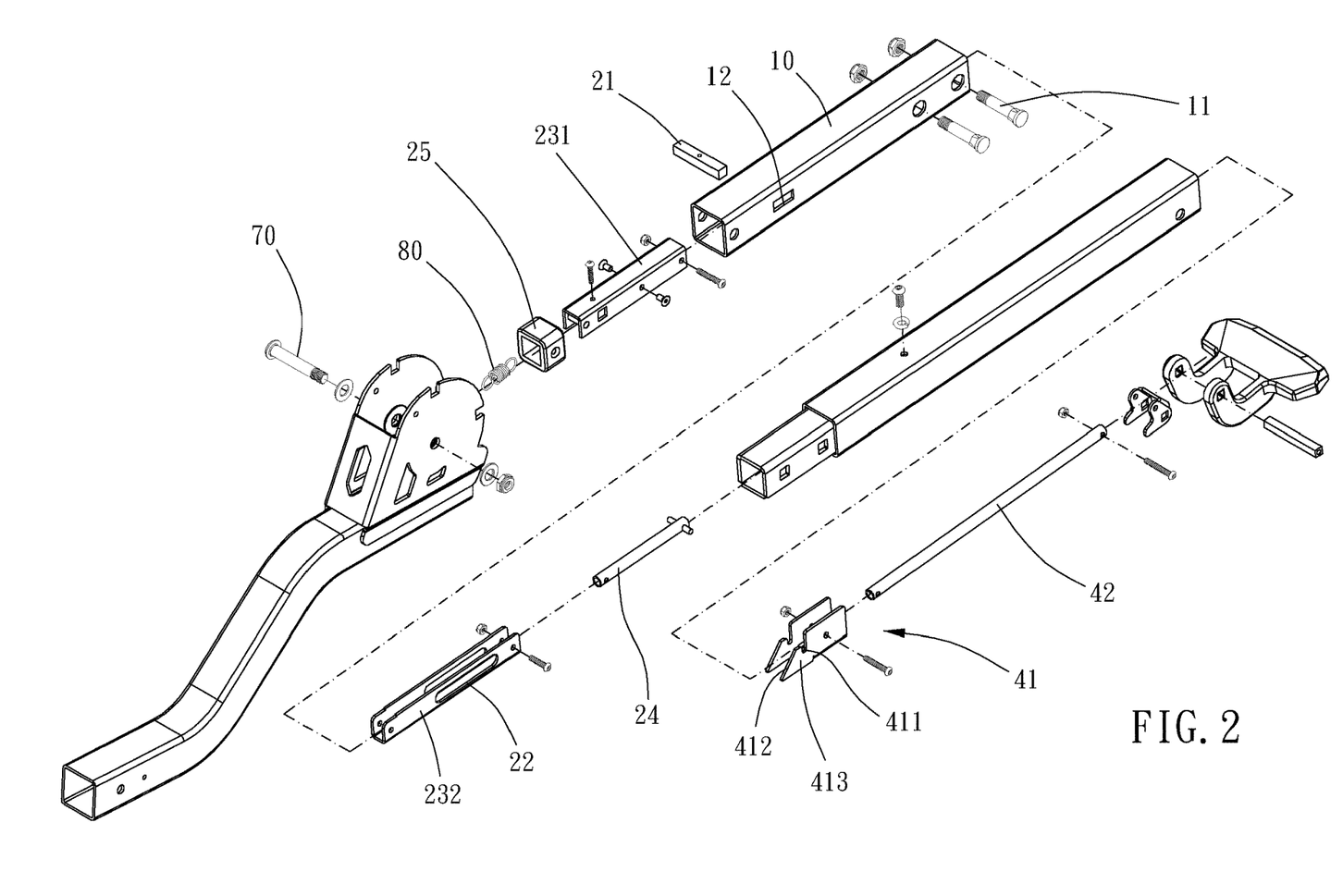
FIG. 2 is a breakdown drawing of a preferable embodiment of the present invention.
Figure 3:
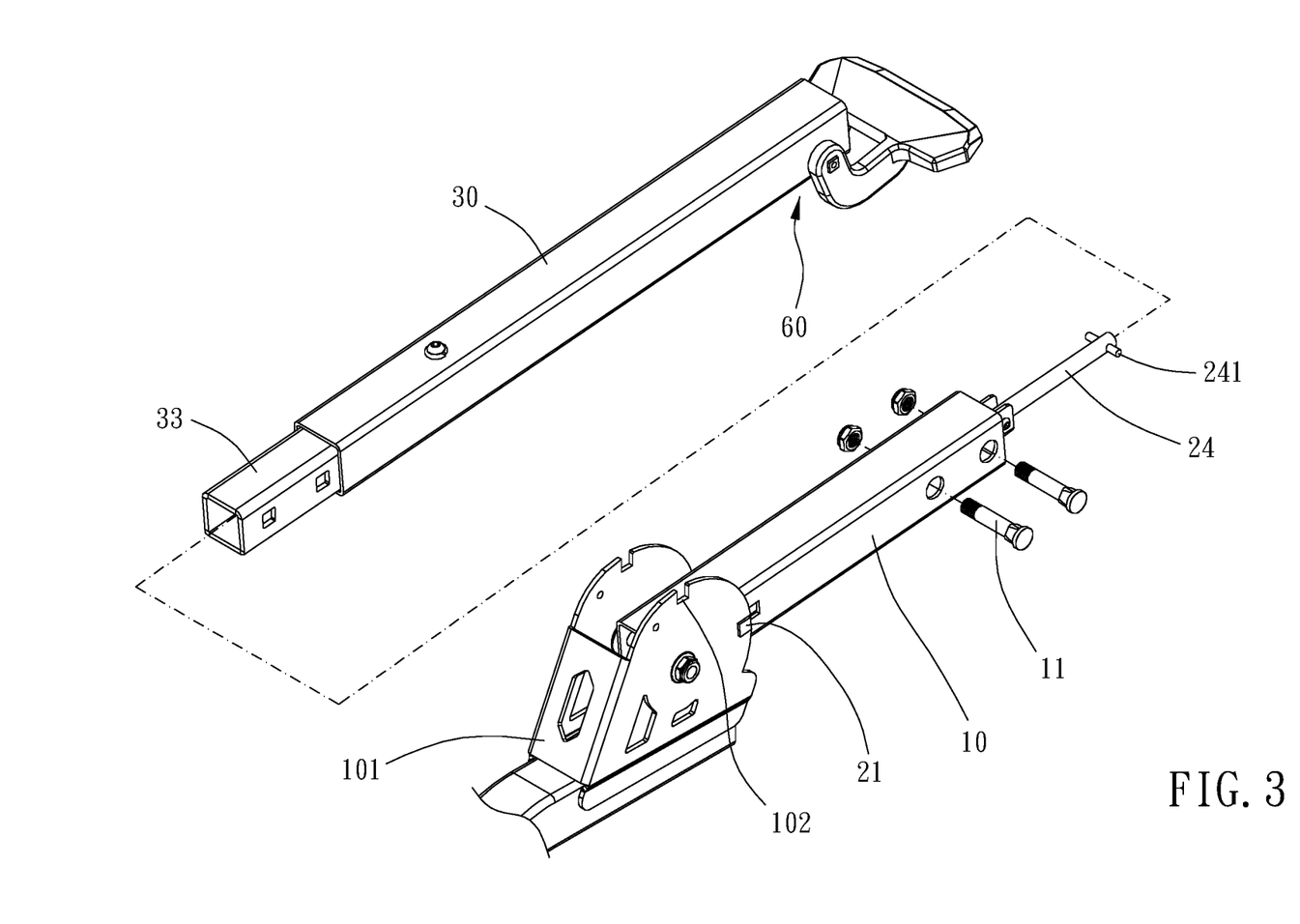
FIG. 3 is a partial breakdown drawing of a preferable embodiment of the present invention.

At least one pin 11 is disposed on the first rod member 10, the first connecting rod 20 further includes at least one guiding slot 22, and the at least one pin 11 is disposed through the first rod member 10 and the second rod member 30, extends within the at least one guiding slot 22 and is slidable relative to the at least one guiding slot 22, so that the first rod member 10 and the second rod member 30 can be stably connected and the at least one guiding slot 22 can guide the moving path of the first connecting rod 20. The first connecting rod 20 further includes a main rod body 23 on which the at least one second engaging portion 21 is disposed and a movable rod 24 rotatably connected with the main rod body 23. The second connecting rod 40 includes an assembling base 41. One of the movable rod 24 and the assembling base 41 includes at least one engaging slot 411, and the other of the movable rod 24 and the assembling base 41 includes at least one engaging projection 241 releasably engaged with the at least one engaging slot 411. In this embodiment, the movable rod 24 includes the at least one engaging projection 241, and the assembling base 41 includes the at least one engaging slot 411; the assembling base 41 further includes at least one inclined face 412 inclined to a longitudinal direction of the movable rod 24, and during sleeving of the first rod member 10 and the second rod member 30, the at least one engaging projection 241 slides along the at least one inclined face 412 toward the at least one engaging slot 411, for easy assembling. Specifically, the assembling base 41 includes two side plates 413 which are separately arranged in parallel, each said side plate 413 includes one said engaging slot 411 and one said inclined face 412, wherein the at least one engaging projection 241 may include pillar(s) or pin(s) protrusive radially beyond the movable rod 24, and thus it has a simple structure and provides stable connection. In other embodiments, one of the assembling base and the movable rod may be provided with the engaging slot, and two sides of the other of the assembling base and the movable rod may be provided with the engaging projection.

The first rod member 10 is a tubular member, the first connecting rod 20 further includes at least one annular projection 25, and each said annular projection 25 has an outer contour matching with an inner contour of an inner face of the first rod member 10. The second rod member 30 is a tubular member, the assembling base 41 has an outer contour matching with an inner contour of an inner face of the second rod member 30, thus stably guiding the first connecting rod 20 and the second connecting rod 40 to move relative to the first rod member 10 and the second rod member 30, respectively. In this embodiment, each of the first rod member 10 and the second rod member 30 is a rectangular tube, the at least one annular projection 25 is a rectangular body sleeved with the first connecting rod 20 and having a smooth outer circumferential surface, the assembling base 41 is a one-piece plate bent into a U-shaped member. However, the assembling base may be provided with at least one annular projection; the at least one annular projection may integrally protrude from the first connecting rod; each said annular projection may include a plurality of projections circumferentially arranged in intervals or a plurality of L-shaped plate corresponding to corner of the rectangular tube. Preferably, the first rod member 10 includes at least one through hole 12 disposed radially therethrough, and the at least one second engaging portion 21 is movably disposed through the at least one through hole 12. The at least one annular projection 25 of the first connecting rod 20 is located between the at least one through hole 12 and the at least one guiding slot 22, a longitudinal direction of the at least one guiding slot 22 is parallel to a longitudinal direction of the at least one through hole 12, which prevents deviation of moving paths of the at least one second engaging portion 21 and the at least one pin 11.

Figure 4:
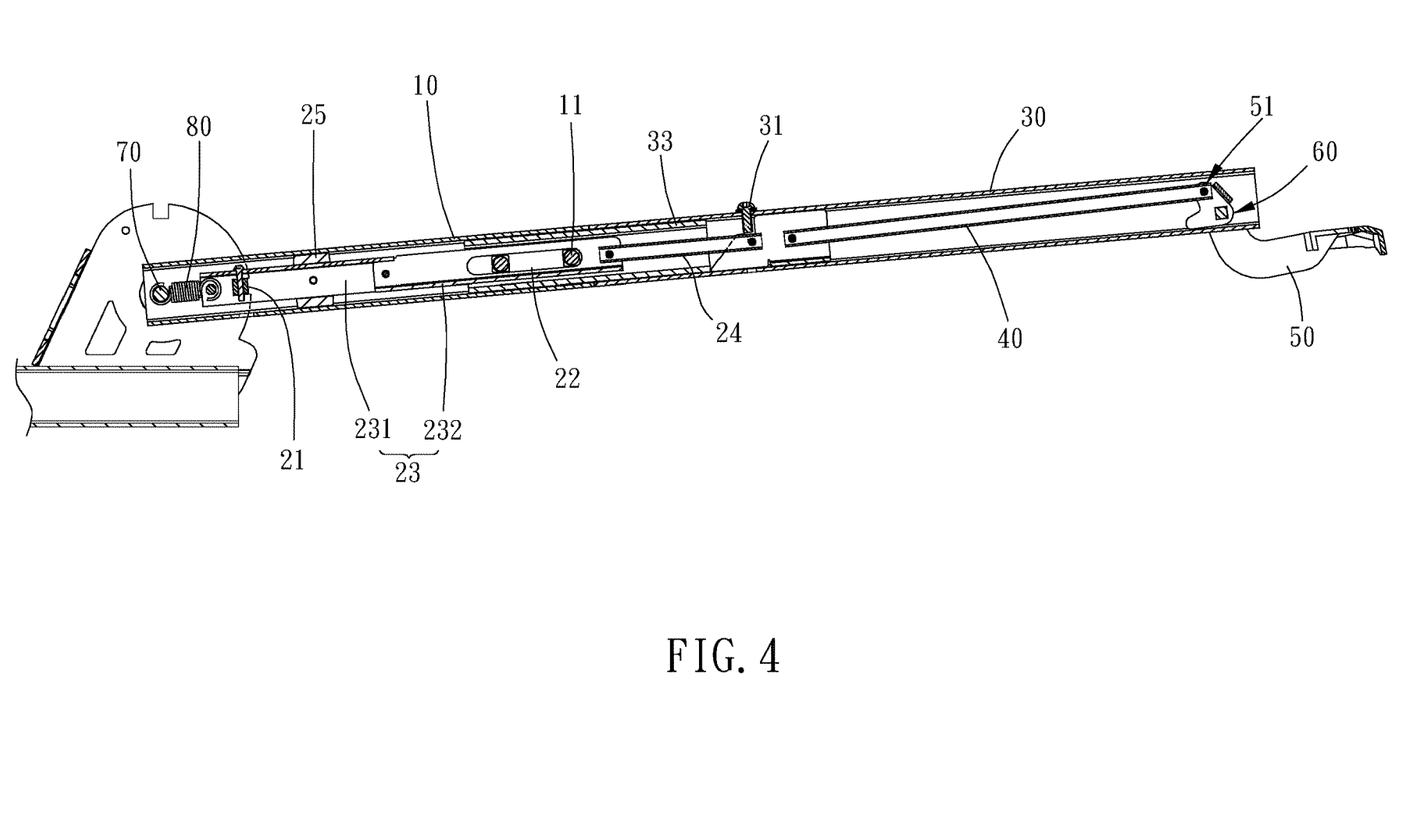
FIGS. 4 and 5 are cross-sectional views showing operation of a preferable embodiment of the present invention.

The second rod member 30 further includes at least one restriction member 31 which is adjustable, and the at least one engaging projection 241 is blockable by the at least one restriction member 31 to be restricted within the at least one engaging slot 411 so that the movable rod 24 is not disengageable from the at least one engaging slot 411 (FIG. 4). Preferably, a through hole 32 is disposed at a side of the second rod member 30 which is located opposite to the opening of the engaging slot 411 and corresponds to the movable rod 24. To detach the second rod member 30 from the first rod member 10, the through hole 32 is configured for insertion of a pin or the like to push the movable rod 24 so that the at least one engaging projection 241 is disengaged from the at least one engaging slot 411 (FIG. 6), which is easy to operate.

In this embodiment, the main rod body 23 includes a first member 231 on which the at least one second engaging portion 21 is disposed and a second member 232 connected between the first member 231 and the movable rod 24, the second member 232 includes the at least one guiding slot 22 and partially overlap radially with the first member 231. Each of the first member 231 and the second member 232 has a U-shaped cross-section, which can be stably connected and driven and has a light weight. The first member and the second member may be integrally formed of one piece to form the main rod body. Each of the first member and the second member may be a rectangular tube. The second rod member 30 further includes a sleeve portion 33 sleeved with the first rod member 10, and the sleeve portion 33 and the second member 232 at least partially overlap radially, which provides stable and strong combination and structural strength.

Figure 5:
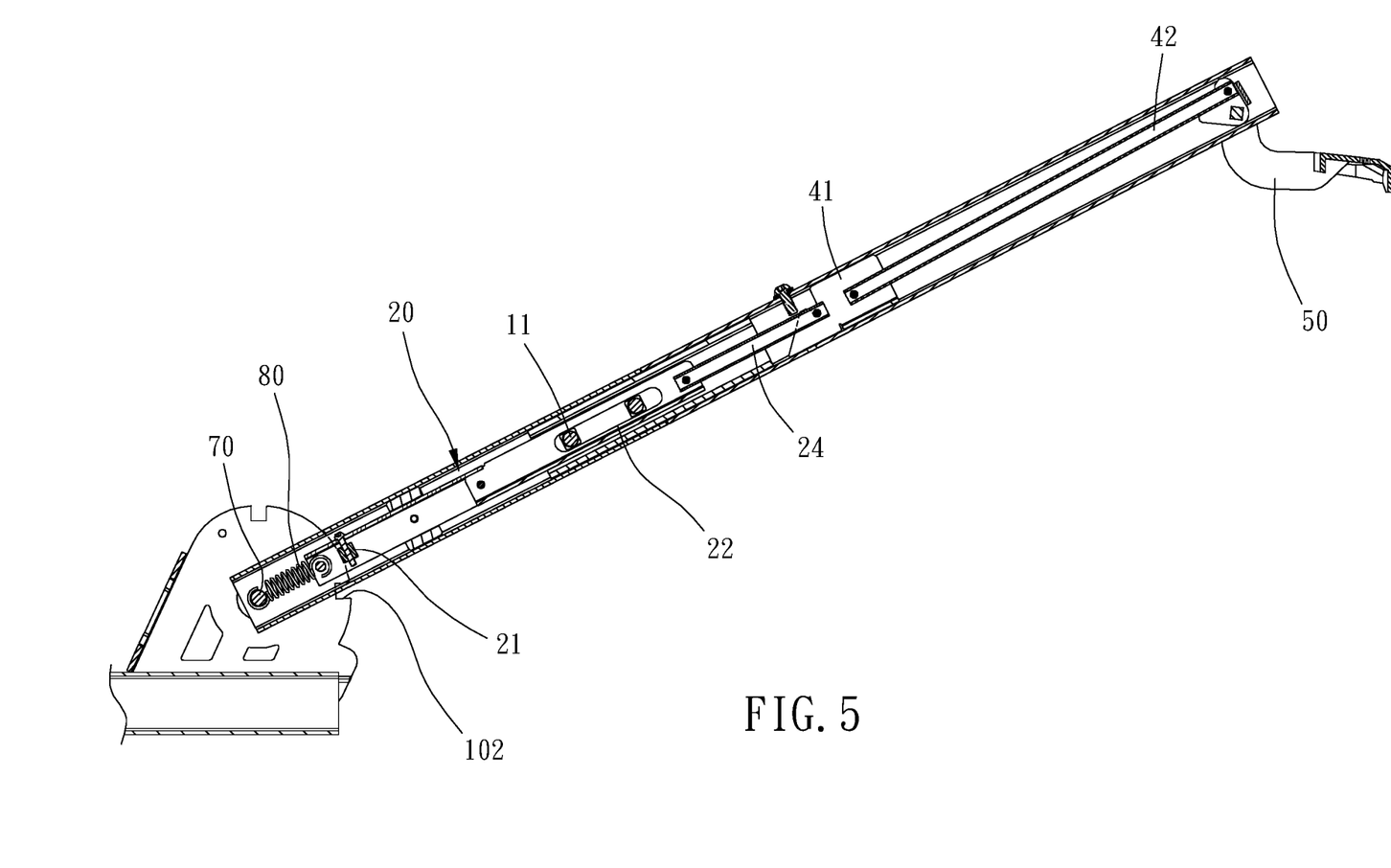
Figure 6:
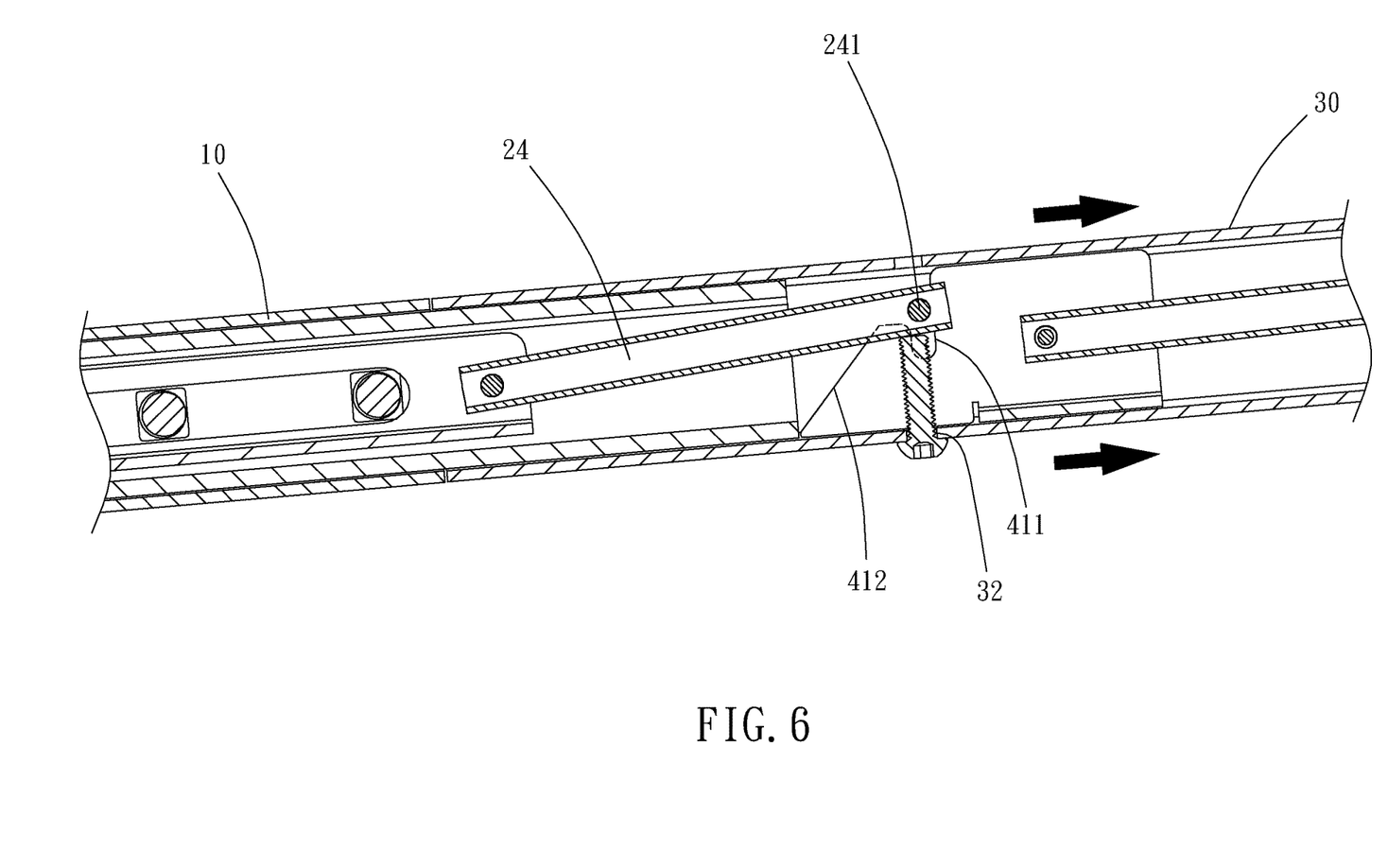
FIG. 6 is a partial cross-sectional view showing operation of a preferable embodiment of the present invention.

The second connecting rod 40 includes a driving rod 42 rotatably connected with the assembling base 41, the operating member 50 and the second rod member are rotatably connected at a pivot portion 60, the operating member 50 includes a swingable portion 51 radially extending relative to the pivot portion 60, and the driving rod 42 and the swingable portion 51 are rotatably connected with each other. As shown in FIGS. 4 and 5, by swinging of the operating member 50, the driving rod 42 drives the assembling base 41 to move along an axial direction of the second rod member 30 so as to move the first connecting rod 20 so that the at least one second engaging portion 21 moves between the locking position and the release position, thus being easy to operate. The operating member may be unrotatably connected to the driving rod, and the operating member may be directly moved axially to lock or unlock the at least one second engaging portion.

Preferably, the swinging locking mechanism 1 further includes a shaft 70 by which the base 101 and the first rod member 10 are rotatably connected and an elastic member 80 disposed between the shaft 70 and the first connecting rod 20, and the elastic member 80 forces the first connecting rod 20 so that the at least one second engaging portion 21 is biased toward the locking position. However, the elastic member may be a torsion spring disposed on the swingable portion; the elastic member may be disposed between the first rod member and the first connecting rod or disposed between the second rod member and the second connecting rod.

Figure 1:
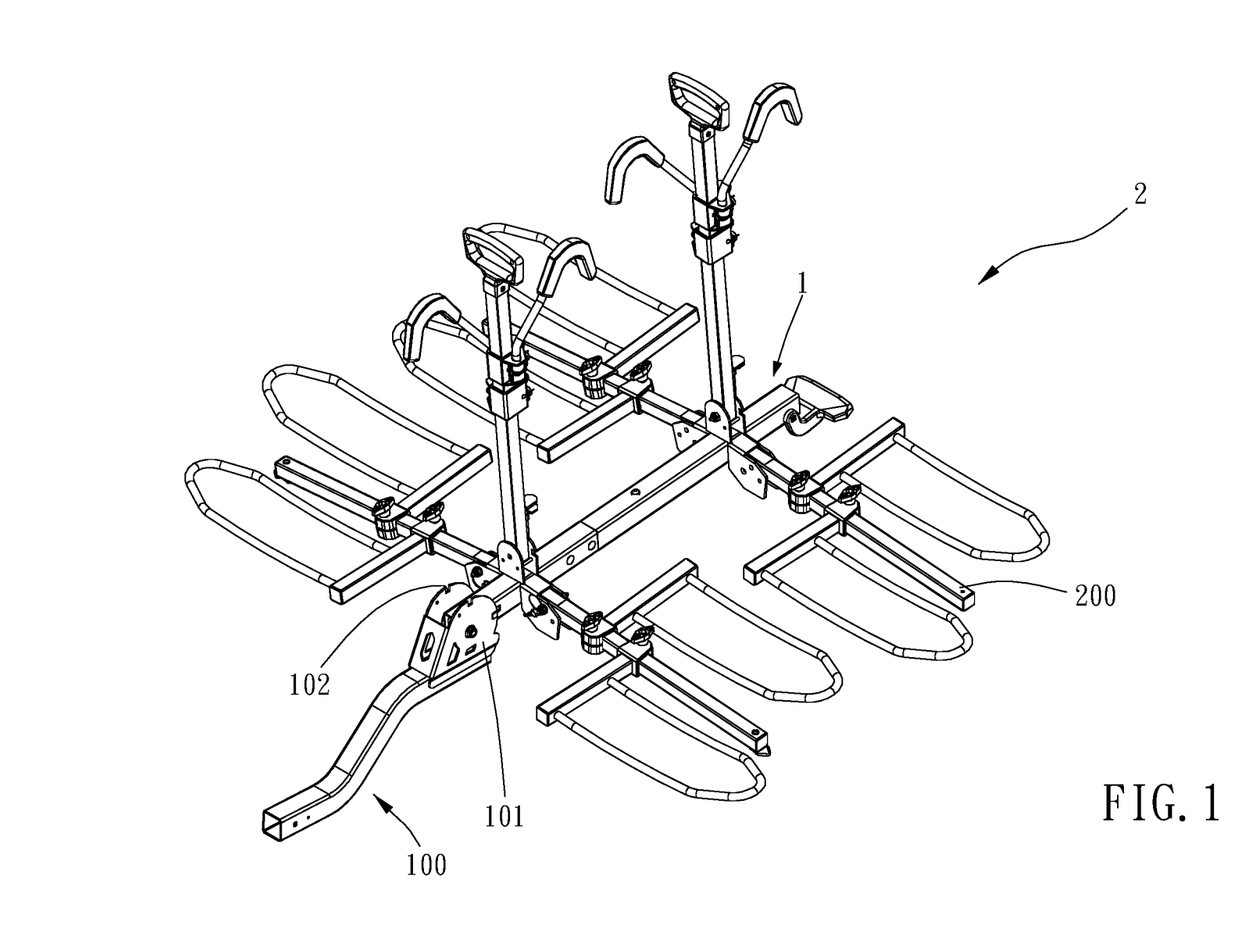
FIG. 1 is a stereogram of a preferable embodiment of the present invention.

A bicycle rack 2 is further provided. The bicycle rack 2 includes one said swinging locking mechanism 1 and at least one carrying frame 200. The at least one carrying frame 200 is connected with the swinging locking mechanism 1 and configured to carry at least one bicycle. The operating member 50 can drive the at least one second engaging portion 21 to move between the locking position and the release position, and the first rod member 10 and the second rod member 30 can be detached from each other, which is advantageous for storage and/or transportation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A swinging locking mechanism for a bicycle rack, the swinging locking mechanism being assembled with a base of a hanging member which is configured to be detachably connected to a hitch mechanism of a vehicle, the base including at least one first engaging portion, the swinging locking mechanism including:
   a first rod member, configured to be movably assembled to the base;
   a first connecting rod, movably disposed on the first rod member and including at least one second engaging portion releasably engaged with the at least one first engaging portion, the at least one second engaging portion being movable between a locking position and a release position;
   a second rod member, non-swingably sleeved with the first rod member; a second connecting rod, movably disposed on the second rod member and detachably assembled with the first connecting rod; and
   an operating member, connected with the second connecting rod;
   wherein when the at least one second engaging portion is located in the locking position, the at least one second engaging portion and the at least one first engaging portion are engaged with each other, and the swinging locking mechanism is non-swingable relative to the base; when the operating member operates to drive the second connecting rod and the first connecting rod to move the at least one second engaging portion to be located in the release position, the at least one second engaging portion and the at least one first engaging portion are disengaged with each other, the swinging locking mechanism is swingable relative to the base;
   wherein at least one pin is disposed on the first rod member, the at least one pin is disposed through the first rod member and the second rod member, the at least one pin extends to be within at least one guiding slot on the first connecting rod, and the at least one pin is slidable relative to the first connecting rod;
   wherein the first connecting rod further includes a first member fixedly attached to the first rod member and a second member movable within the first rod member, and the at least one guiding slot is located on the second member.

2. The swinging locking mechanism of claim 1, wherein the first rod member is a tubular member, the first connecting rod further includes at least one annular projection, and each said annular projection has an outer contour matching with an inner contour of an inner face of the first rod member.

3. The swinging locking mechanism of claim 2, wherein the first rod member is a tubular member and includes at least one through hole disposed radially therethrough, the at least one second engaging portion is movably disposed through the at least one through hole; the at least one annular projection is located between the at least one through hole and the at least one guiding slot; the first connecting rod further includes a main rod body on which the at least one second engaging portion is disposed and a movable rod rotatably connected with the main rod body, the second connecting rod includes an assembling base, one of the movable rod and the assembling base includes at least one engaging slot, and the other of the movable rod and the assembling base includes at least one engaging projection releasably engaged with the at least one engaging slot; the main rod body includes the first member on which the at least one second engaging portion is disposed and the second member connected between the first member and the movable rod, and the second member and the first member partially overlap radially; the second rod member further includes a sleeve portion sleeved with the first rod member, the sleeve portion and the second member at least partially overlap radially; the assembling base further includes at least one inclined face inclined to a longitudinal direction of the movable rod, and during sleeving of the first rod member and the second rod member, the at least one engaging projection slides along the at least one inclined face toward the at least one engaging slot; the second rod member is a tubular member, the assembling base further includes at least one annular projection, and each said annular projection has an outer contour matching with an inner contour of an inner face of the first rod member; the second rod member further includes at least one restriction member which is adjustable, and the at least one engaging projection is blockable by the at least one restriction member to be restricted within the at least one engaging slot so that the movable rod is not disengageable from the at least one engaging slot; the second connecting rod includes a driving rod rotatably connected with the assembling base, the operating member and the second rod member are rotatably connected at a pivot portion, the operating member includes a swingable portion radially extending relative to the pivot portion, and the driving rod and the swingable portion are rotatably connected with each other; the swinging locking mechanism further includes a shaft by which the base and the first rod member are rotatably connected and an elastic member disposed between the shaft and the first connecting rod, and the elastic member forces the first connecting rod so that the at least one second engaging portion is biased toward the locking position.

4. A bicycle rack, including the swinging locking mechanism of claim 1, further including:
   at least one carrying frame, connected with the swinging locking mechanism, configured to carry at least one bicycle.

5. A swinging locking mechanism for a bicycle rack, the swinging locking mechanism being assembled with a base of a hanging member which is configured to be detachably connected to a hitch mechanism of a vehicle, the base including at least one first engaging portion, the swinging locking mechanism including:
   a first rod member, configured to be movably assembled to the base;
   a first connecting rod, movably disposed on the first rod member and including at least one second engaging portion releasably engaged with the at least one first engaging portion, the at least one second engaging portion being movable between a locking position and a release position; a second rod member, non-swingably sleeved with the first rod member;
   a second connecting rod, movably disposed on the second rod member and detachably assembled with the first connecting rod; and
   an operating member, connected with the second connecting rod;

wherein when the at least one second engaging portion is located in the locking position, the at least one second engaging portion and the at least one first engaging portion are engaged with each other, and the swinging locking mechanism is non-swingable relative to the base; when the operating member operates to drive the second connecting rod and the first connecting rod to move the at least one second engaging portion to be located in the release position, the at least one second engaging portion and the at least one first engaging portion are disengaged with each other, the swinging locking mechanism is swingable relative to the base;

wherein the first connecting rod further includes a main rod body on which the at least one second engaging portion is disposed and a movable rod rotatably connected with the main rod body, the second connecting rod includes an assembling base, one of the movable rod and the assembling base includes at least one engaging slot, and the other of the movable rod and the assembling base includes at least one engaging projection releasably engaged with the at least one engaging slot.

6. The swinging locking mechanism of claim 5, wherein the assembling base further includes at least one inclined face inclined to a longitudinal direction of the movable rod, and during sleeving of the first rod member and the second rod member, the at least one engaging projection slides along the at least one inclined face toward the at least one engaging slot.

7. The swinging locking mechanism of claim 5, wherein the main rod body includes a first member on which the at least one second engaging portion is disposed and a second member connected between the first member and the movable rod, and the second member and the first member partially overlap radially.

8. The swinging locking mechanism of claim 5, wherein the second rod member further includes at least one restriction member which is adjustable, and the at least one engaging projection is blockable by the at least one restriction member to be restricted within the at least one engaging slot so that the movable rod is not disengageable from the at least one engaging slot.

9. The swinging locking mechanism of claim 5, wherein the second connecting rod includes a driving rod rotatably connected with the assembling base, the operating member and the second rod member are rotatably connected at a pivot portion, the operating member includes a swingable portion radially extending relative to the pivot portion, and the driving rod and the swingable portion are rotatably connected with each other.

* * * * *